Nov. 21, 1950        A. J. DADDONA        2,530,569
MEANS FOR SEPARATING THE SPRING FINGERS OF FEED CHUCKS
Filed Nov. 27, 1948
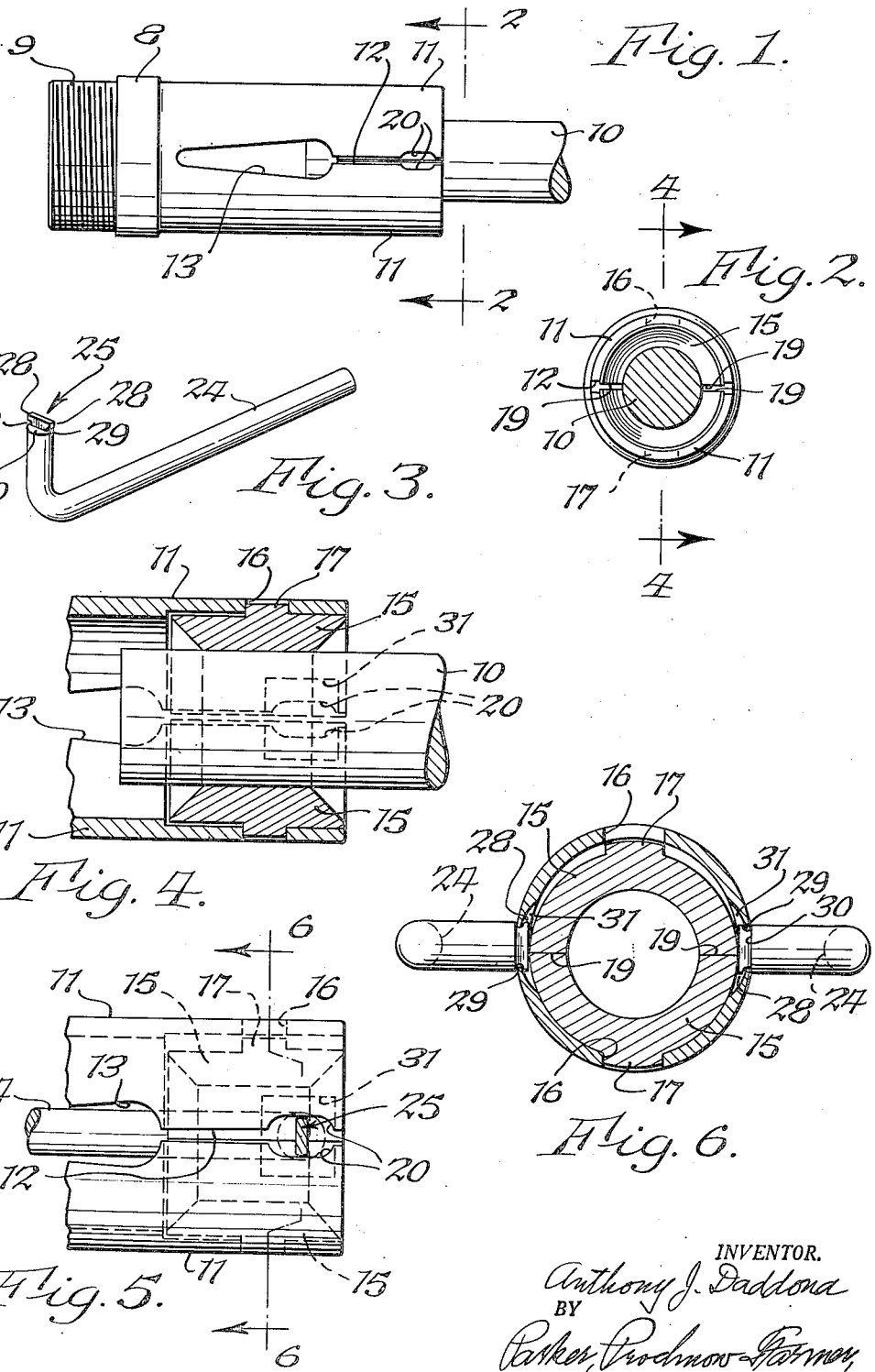
INVENTOR.
Anthony J. Daddona
BY
Parker, Prochnow & Farner,
Attorneys.

Patented Nov. 21, 1950

2,530,569

UNITED STATES PATENT OFFICE 2,530,569

MEANS FOR SEPARATING THE SPRING FINGERS OF FEED CHUCKS

Anthony J. Daddona, Elmira, N. Y., assignor to Hardinge Brothers, Inc., Elmira, N. Y.

Application November 27, 1948, Serial No. 62,348

3 Claims. (Cl. 279—41)

This invention relates to improvements in feed chucks of the kind commonly used for advancing work in automatic screw machines or the like, and more particularly to feed chucks of the type in which removable work engaging pads are arranged at the ends of the spring fingers of the chuck.

One of the objects of this invention is to provide means of improved construction for facilitating the spreading apart of the spring fingers of a feed chuck for the purpose of inserting and removing the work engaging pads. A further object is to provide spreading means of this type which may be used in connection with standard pads without requiring any changes in the pads themselves. Other objects and advantages will be apparent from the following description of one embodiment of the invention and the novel features will be particularly pointed out hereinafter in connection with the appended claims.

This invention relates to improvements in feed chucks of the general type shown in the Daddona application for patent No. 684,390, filed July 17, 1946.

In the accompanying drawings:

Fig. 1 is a side elevation of a feed chuck embodying this invention and showing the same engaging the workpiece.

Fig. 2 is an end view thereof, taken on line 2—2, Fig. 1.

Fig. 3 is a perspective view of a tool or implement for spreading or separating the spring fingers.

Fig. 4 is a fragmentary longitudinal central sectional elevation of the feed chuck, the section being taken on line 4—4, Fig. 2.

Fig. 5 is a fragmentary side elevation of the feed chuck showing the fingers thereof separated by means of the implement shown in Fig. 3.

Fig. 6 is a transverse section thereof, on line 6—6, Fig. 5.

The improvements embodying this invention may be applied to any suitable or desired type of feed chuck, that shown for purposes of illustration including the usual tubular body portion 8 having one end thereof threaded as shown at 9 for attaching the feed chuck to a part of an automatic screw machine or other type of machine which moves the feed finger back and forth for feeding the work 10. The feed chuck may be provider with any desired number of feed fingers 11, these fingers being formed by means of longitudinal slots 12 cut into the feed chuck from one end thereof and terminating at a distance from the other end. These slots may be of any suitable type, those shown having enlarged portions 13 arranged at the inner ends of the slots 12. The feed chuck is preferably provided at the outer or free ends of the feed fingers 11 with suitable work engaging pads 15, one pad being provided for each spring finger, and the width of each pad being preferably coextensive with the width of the finger on which it is used. These pads 15 have their inner faces formed to engage the work 10 and the pads are formed so as to engage the spring fingers to hold the pads in place with relation to the fingers. Any suitable or desired means may be employed for holding these pads on the spring fingers, and in the construction shown, each finger is provided with an aperture 16 near the end thereof and each pad is provided on the outer face thereof with a projection 17 formed to extend into the aperture 16. It will be noted that when the work is positioned in the feed chuck, the spring fingers will press the pads against the work with sufficient force to ensure the feeding of the work when the feed chuck is reciprocated, and this pressure of the pads against the work also serves to hold the projections 17 in the holes or apertures 16 in the spring fingers. When the work is removed from the feed chuck, the resiliency of the spring fingers causes the free ends of the spring fingers to move toward each other and will then press the adjacent edge portions 19 of the pads against each other. Pads and holding means of any other suitable or desired construction may be employed if desired.

In order to facilitate the removal of the pads from the spring fingers by separating the free ends of the fingers from each other, various tools or implements have heretofore been provided which extend into the slots 12 of the feed chuck and by means of which the outer ends of the spring fingers may be pried apart. Generally such tools or implements are applied to portions of feed chucks intermediate of the ends thereof, for the reason that the pads themselves interfere with the insertion of tools or implements into the outer ends of the slots to enable the spring fingers to be pried apart. In accordance with this invention, however, the implement for spreading or separating the outer ends of the spring fingers is constructed to operate very near to the outer ends of the spring fingers, where the minimum amount of force is required to separate the fingers, this being particularly desirable when this invention is used in connection with large feed chucks in which a great deal of force is required to separate the outer ends of the spring fingers.

In accordance with this invention, enlargements 20 are provided in the slots 12 adjacent to the outer ends thereof, formed by cutting recesses in the spring fingers adjacent to the ends thereof, two such recesses being shown at opposite edge portions of adjacent spring fingers and facing each other, but if desired, the enlargement may be formed by a single recess in only one of two adjacent edges of the spring fingers. These enlargements have parallel edges extending parallel to the edges of the slots 12 and are of sufficient length to enable an implement to be inserted into the enlargement, and the enlargement is preferably so located with reference to the slot 12 that the enlargement does not extend to the open end of the slot 12, nor into the enlarged portion 13 of the slot, so that a portion of the narrow slot 12 extends beyond the enlargement 20 to the outer end of the feed chuck and to the enlarged portion 13. An implement with a flat end portion may, consequently, be inserted into the enlargement 20 and turned through approximately 90 degrees so as to pry the spring fingers apart and the fact that the enlargement does not extend to the end of the feed chuck nor into the enlarged portion 13 would prevent the implement from slipping out of the slot lengthwise thereof.

It is, however, also desirable to provide means for preventing the instrument from slipping out of the enlargement 20 laterally or radially of the feed chuck, and for this purpose, an implement may be provided as illustrated particularly in Figs. 3, 5 and 6. This implement may have a handle 24 of any suitable form and may have an end portion thereof bent over and provided at its outer end with a key 25 which includes two flat sides, the key being of such size that it can readily be inserted into the enlargement 20 with the flat sides extending substantially parallel to the length of the feed chuck. It will be noted that the key portion of the implement is preferably of approximately T-shape being provided with notches 29 in the side thereof, thus forming a head with lateral extensions 28 at the end of the key portion. The implement 24 is preferably made of stock that is substantially circular in cross section and the key may be formed by first cutting an annular groove adjacent to the end portion of the implement and then milling or otherwise cutting the metal from opposite sides of the key portion, thus forming a flat neck terminating at its outer end in an enlarged head. When the key portion of this implement is inserted into the enlargement 20 of the slot 12, the end 30 of the implement from which the key portion projects forms a shoulder which acts as a stop to limit the extent to which the key may be inserted into the enlargement. When the implement is turned through approximately a right angle into the position shown in Figs. 5 and 6, the projections 28 forming the head of the T-shaped key will be in positions to engage the inner surfaces of adjacent spring fingers 11 so that removal of the key portion laterally of the feed chuck is absolutely prevented. This, therefore, makes it safe to operate even on a large size feed chuck by means of the implements shown, since it is impossible for the implement to move out of its finger spreading position and thus inadvertently to permit the fingers to come together.

Since the pads ordinarily fit snugly within the inner surfaces of the spring fingers, it is necessary to provide some means for permitting the key portion of the implement to be completely inserted into the enlargement 20 of the slot, so that the head of the key will be within the interior of the feed chuck, and for this purpose, the interior surfaces of the spring fingers adjacent to the enlargements 20 are provided with recesses or undercut portions 31 at each side of the enlargements 20 of the slots 12. These recesses must be of sufficient depth to permit the head of the T-shaped key to enter into the same. The key portion is made of such length that when the circular stop portion or shoulder 30 engages the outer surface of the spring fingers, the inner edge of the key portion will not press against the pads 15, which would interfere with the ready removal of the same and with the replacing of other pads between the ends of the spring fingers. These recesses may readily be formed in the spring fingers by means of circular grinding or cutting tools which may be inserted into the interior of the feed chuck during their cutting operations. Consequently, because of these recesses 31 in the spring fingers, the key portions of the implements can be readily inserted into the enlargements 20 in the slots and the implements then turned through about 90 degrees to pry the ends of the spring fingers apart. Since the keys on the end of the implements will be located entirely within the recesses or undercut portions 31 of the spring fingers, they will not in any way interfere with the removal or replacement of the pads.

By means of the construction described, pads such as heretofore commonly used on feed chucks, may be used without change on feed chucks constructed according to this invention.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. An improved feed chuck with a passage therethrough and comprising a plurality of spring fingers all anchored at one end and free at their other ends, the free ends being separated by slots running lengthwise from said free ends, and a work engaging pad removably fitting the inner face of each free end of a finger and extending lengthwise along it for a substantial distance, each slot having an enlargement in width in the portion past which the pads extend and spaced from the free open end of the slot by an unenlarged portion, each of said fingers at a side of an enlargement of a slot being undercut to form a space between a spring finger and a pad, whereby when a key with a flat end is inserted in said enlargement and turned to spread said fingers, a flange on the inserted free end of the key may turn in said space to lie along the inner face of a finger and prevent endwise removal of the key from the slot while the fingers are spread by that key.

2. A feed chuck having spring fingers extending lengthwise thereof and terminating at one end of said chuck and spaced from each other by longitudinal slots, a work engaging pad removably connected with the end portion of each spring finger and removable from said spring fingers when the same are separated, said slots having enlargements adjacent to the outer ends thereof, the inner faces of said spring fingers adjacent to each enlargement having undercut recesses therein at the sides of said enlargements of said slots which form spaces between said pads and said spring fingers into which a head of a key may enter when the key is inserted in a radial direction into an enlargement to spread said spring fingers apart to prevent movement of the key laterally of said feed chuck.

3. The combination of a feed chuck having a plurality of spring fingers anchored at one end and free at their outer ends, said spring fingers being separated from each other by slots extending lengthwise from said free ends, work engaging pads removably fitting the inner faces of the free end portions of said fingers, each slot having an enlargement in width in a portion past which the pads extend and spaced from the free open end of the slot by an unenlarged portion, said spring fingers at the enlarged portions of said slots being provided on their inner faces with recesses forming spaces between said spring fingers and said pads, whereby an implement for spreading apart said free ends of said spring fingers and including a shoulder and a T-shaped flat key formed on the end thereof and extending beyond said shoulder, may be inserted in a direction radial to said feed chuck into said enlargement of said slot with the flat faces thereof extending substantially parallel with said slot, said implement when turned through approximately 90 degrees causing said key portion to spread said fingers apart and causing the head of the T-shaped portion to enter into said recesses of adjacent fingers, said recesses of said enlargement confining said head of said key portion against movement both lengthwise of said slot and radially of said feed chuck.

ANTHONY J. DADDONA.

REFERENCES CITED

The following references are of record in the file of this patent:

UNITED STATES PATENTS

| Number | Name | Date |
| --- | --- | --- |
| 1,725,492 | Tessky | Aug. 20, 1929 |
| 1,937,236 | Laughlin | Nov. 28, 1933 |
| 2,069,775 | Rich | Feb. 9, 1937 |